Oct. 11, 1932.  N. G. PAPAC  1,881,908
APPLE SLICING MACHINE
Filed Jan. 7, 1931
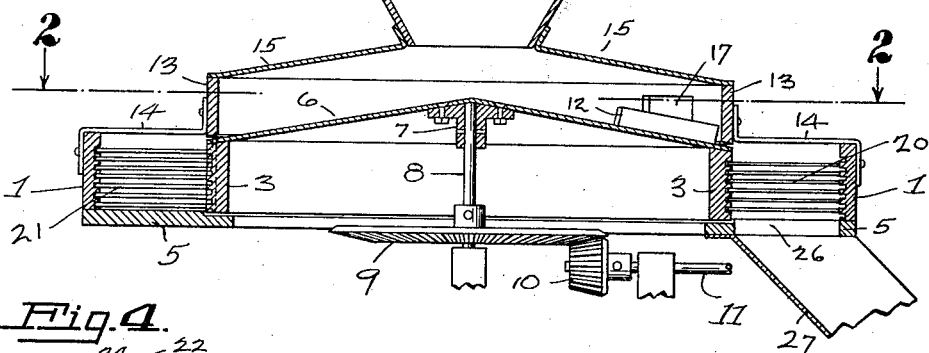
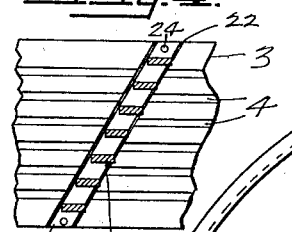
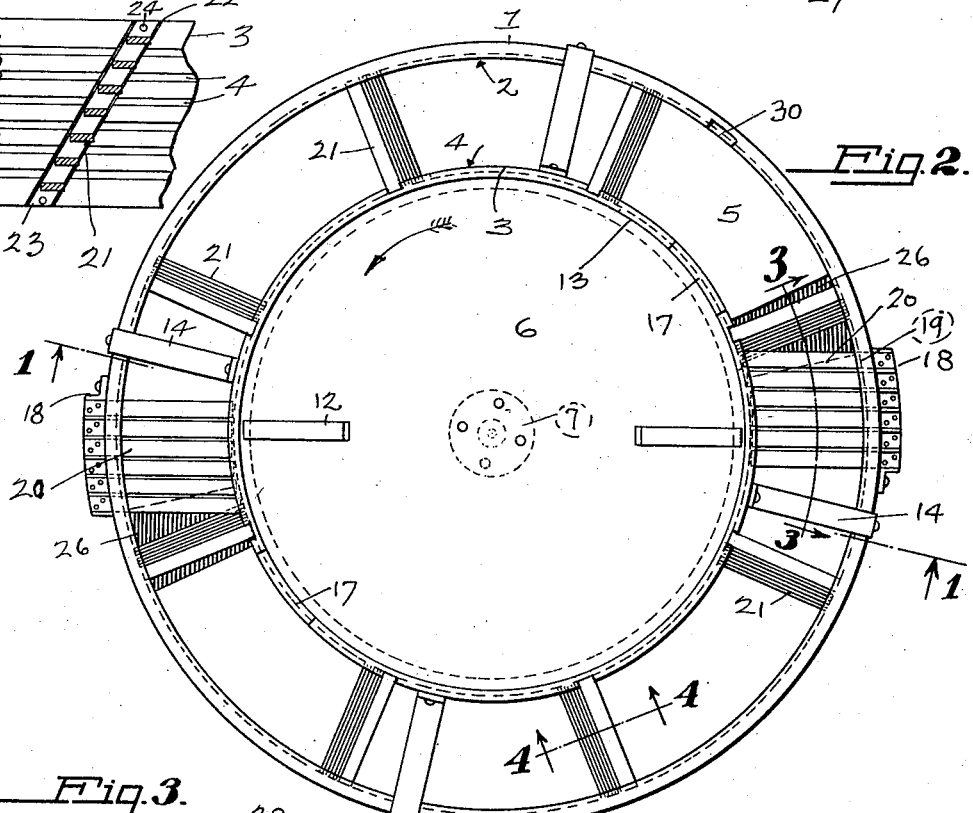
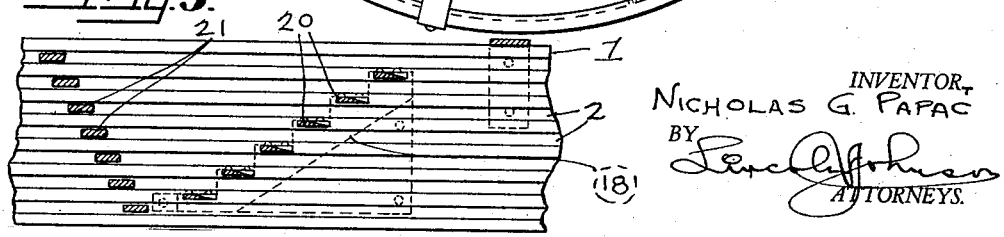
INVENTOR
NICHOLAS G. PAPAC
BY
ATTORNEYS.

Patented Oct. 11, 1932

1,881,908

UNITED STATES PATENT OFFICE

NICHOLAS G. PAPAC, OF WATSONVILLE, CALIFORNIA

APPLE SLICING MACHINE

Application filed January 7, 1931. Serial No. 507,143.

This invention relates particularly to an apple slicing machine.

An object of the invention is to provide in a machine for slicing apples and similar fruit or vegetables which will speedily and automatically feed, cut, and discharge the apples or other fruit or vegetables, without mutilation or undue injury thereto.

A still further object of the invention is to provide a pair of circular frames, one being mounted concentrically within the other, the outer circular frame being stationary and carrying sets of stepped cutting knives thereon, and the inner circular frame being rotatable and carrying sets of spaced sweep arms thereon, the free ends of both the knives and sweeps being supported in guides in the opposite frame to that on which the knives and sweeps are mounted, whereby the apples to be sliced, which have first been pared and cored, are carried by the sweeps on the rotating frame against the series of stationary knives serving to cut the apples into thin slices of uniform thickness.

Other objects and advantages are to provide an apple slicing machine that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying one sheet of drawing:

Fig. 1 represents a vertical cross section through an apple slicing machine constructed in accordance with my invention, taken on the line 1—1 of Fig. 2.

Fig. 2 is a plan section taken through Fig. 1 on the line 2—2.

Fig. 3 is an enlarged section taken through the knives and sweeps on the line 3—3 of Fig. 2.

Fig. 4 is a section taken through the sweeps on the line 4—4 of Fig. 2.

In detail the construction illustrated in the drawing comprises an apple, or fruit, or vegetable, slicing machine consisting of an outer circular frame 1, having the inner circumference thereof provided with a row of circular grooves 2 therearound. A circular frame 3 is mounted concentrically within the outer frame 1 and in spaced relation therewith, said inner frame having a row of grooves 4 around the outer circumference thereof. The respective sets of grooves 2 and 4 in the outer and inner frames, face each other and the grooves in one frame lie intermediate with respect to the grooves in the other frame. Each of the frames 1 and 3 are adapted to be arranged in a horizontal position on the upper side of a table surface 5. The table is ring-like in formation and closes the space at the bottom side of the frames. The outer frame 1 is mounted fixedly on the table 5, while the inner frame 3 is free to be rotated relative thereto.

A coned spillway 6 is provided on the upper side of the inner frame 3, the apex of the cone registering with the central axis of the said inner ring. The outer circumference of the spillway is securely fixed to the upper side of the inner frame. A hub 7 is attached centrally on the under side of the spillway 6, the shaft 8 being secured in said hub. A driving gear 9 is fixed to the shaft 8, and said gear 9 meshes with a gear 10 mounted on a shaft 11 which is connected to a power source for rotating the said gears.

The spillway 6 and inner frame 3 rotate in unison when power is applied thereto, through the gears and shafts referred to. It is to be understood that the invention is not limited to the particular form of driving means illustrated and described, as it would be clearly within the scope of the invention to substitute other forms of driving mechanisms.

The upper side of the spillway 6 is provided with a pair of blocks 12 thereon to be used for disturbing the apples or other fruit lying on the said spillway, and to prevent said articles jamming thereon. A guard rail 13 is arranged above and around the outer circumference of the spillway 6, said guard rail 13 being supported on brackets 14 which are secured to the outer frame 1. The upper side of the guard rail 13 is provided with a cover 15 thereon, into the central part of which extends a hopper 16. The guard rail 13 is provided with openings 17 therethrough, at spaced circumferential points therearound, through which apples resting on the spillway may be discharged into the space between the inner and outer frames, in the manner to be hereinafter described.

The frame 1 on the outer periphery thereof and on diametrically opposite sides, is provided with stepped brackets 18, each bracket being securely fastened to the outside of the frame. The outside of the frame is provided with a plurality of apertures 19 therethrough, lying directly in line with each of the steps on the brackets 18. A knife 20 is bolted at one end to each of the steps on each of the stepped brackets 18, each of said knives projecting through the apertures in the frame 1, and the free or unsupported ends of the said knives are confined in the annular grooves 4, provided around the outer circumference of the inner frame 3.

The plurality of knives 20 mounted on each stepped bracket, are so arranged that the knives spaced farthest from the floor 5 are the first with which the apple will be engaged at the commencement of the slicing operation. Thus, by feeding the apple toward the underside of the knives, greater slicing efficiency is obtained than by moving the apples toward the upper side of the knives during the slicing operation. All of the knives 20 extend inward from the inner circumference of the frame 1, and the edges of said knives are substantially parallel to one another. By confining the free ends of the knives in the guideways provided on the outer circumference of the inner frame, the knives are thus maintained in spaced relation throughout the slicing operation so that a uniform thickness of sliced apple is produced at all times. The construction also permits any knife to be unbolted and removed from the stepped supporting frame without interfering with any other parts of the apparatus.

A plurality of sets of sweeps 21 are arranged in spaced circumferential relation around the outer periphery of the inner frame 3. The inner frame 3 on its outer periphery is provided with slots or grooves 22 cut thereacross at an angle to the vertical, and at spaced circumferential points around said frame. Each set of sweeps 21 consists of a plurality of blades or bars held in stepped or spaced relation on a supporting plate 23. The plate 23 with all of the sweeps 21 thereon, is adapted to be seated in one of the grooves 22 whereby the said sweep arms extend radially outwardly from the outer circumference of the frame and the free ends of said sweeps are confined in the guideways 2 arranged around the inner circumference of the outer frame 1. At one or more points around the inner circumference of the outer frame I provide a plate 30, which is slotted to match the slots on the inner side of said frame and which normally forms a part of the inner surface of said frame. The plate 30 when removed, leaves a slot or gap, through which the sweeps 21 may be moved when placing the sweeps on the inner frame or when removing the same therefrom.

Each plate 23, holding the sweep arms 21, is pinned or bolted at 24 to the frame 3 to hold said sweep arms in a predetermined position. The sweep arms are arranged in spaced relation so as to pass through and between the cutting knives when the said sweep arms are rotated relative to said knives.

The space between each pair of spaced sweeps and between the inner and outer frames, forms a pocket into which a plurality of apples to be sliced are discharged from the spillway 6. As the inner frame 3 and sweep arms 21 are rotated around, the said apples are carried toward the cutting knives and are forced into and through the cutting knives during which operation the said apples are reduced to slices. A discharge opening 26 is provided through the floor 5 at a point adjacent the discharge end of each set of cutting knives, through which the apple slices are discharged and carried off through the chute 27.

It will be noticed that the uppermost bars of the sweeps 21 are inclined progressively forward in the direction of rotation of the frame 3, whereby the angle of inclination of said sweeps will tend to force the apples toward the floor over which the said sweeps move, and thus move said apples beneath and through the progressive, rearwardly inclined cutting knives 20.

Having thus described this invention, what I claim and desire to secure by Letters Patent is:

1. In an apple slicing machine, a pair of circular frames disposed in concentric relation, the inner periphery of the outer frame and the outer periphery of the inner frame having annular guides thereon; a set of knives, each having a common end thereof held in stepped relation on one frame and a plurality of sets of blade sweeps arranged in circumferentially spaced relation around the other frame, the free ends of each of the knives and sweeps being confined to move in the guides in the frame opposite to that on which said knives and blades are mounted; and means to rotate one frame relative to the other frame to pass the sweeps between the knives.

2. An apple slicing machine as set forth in claim 1, including sweeps, each sweep consisting of a row of blades arranged in spaced offset relation so that the plane of the blades in each sweep lies at an angle to the vertical.

3. In an apple slicing machine, a pair of circular frames disposed in concentric relation, the inner periphery of the outer frame and the outer periphery of the inner frame having annular guides thereon; plural sets of knives arranged in spaced circumferential relation around the inner periphery of the outer frame, the knives of each set being arranged in stepped relation and having a common end thereof secured to said outer frame, and having the free ends thereof confined in the annular guides on the inner frame; plural sets of sweeps arranged in spaced circumferential relation around the outer periphery of the inner frame, the sweeps of each set being arranged in stepped relation and having a common end thereof secured to said inner frame and having the free ends of said sweeps confined in the annular guides on the outer frame; and means to rotate the inner frame to pass the sweeps thereon between the knives.

4. An apple slicing machine, as set forth in claim 3, including a table enclosing the space between the inner and outer frames on the bottom side thereof and having plural discharge openings therein on the discharge side of the knives.

5. In an apple slicing machine, a pair of circular frames disposed in concentric relation, the inner frame being rotatable and the outer frame being stationary, and the outer periphery of the inner frame and the inner periphery of the outer frame having annular guides thereon; plural sets of radially disposed knives arranged in spaced circumferential relation around the inner periphery of the outer frame, the knives of each set being arranged in stepped relation and having a common end thereof secured to said outer frame and having the free ends thereof confined in the annular guides on the inner frame; plural sets of radially disposed sweeps arranged in spaced circumferential relation around the outer periphery of the inner frame, the sweeps of each set being arranged in stepped relation and having a common end thereof secured to said inner frame and having the free ends of said sweeps confined in the annular guides on the outer frame; a coned spillway secured on the upper side of the inner frame to direct apples to be sliced toward the periphery thereof; and means connected to the spillway to rotate the spillway and inner frame to pass the sweeps on the inner frame between the knives.

6. An apple slicing machine, as set forth in claim 5, including a stationary guard rail around the periphery of the spillway having openings therein positioned to the rear of the cutting edges of the knives; and a stationary floor between the inner and outer frames having discharge openings therein located at the rear of the cutting edges of the knives.

7. An apple slicing machine including a pair of circular frames disposed in spaced concentric relation, the inner frame being rotatable and the other frame being stationary a floor covering the space between the inner and outer frames at the bottom side thereof; stepped sweeps extended radially outward from the outer periphery of the inner frame in spaced circumferential relation therearound; stepped knives extended inward from the inner periphery of the outer frame in spaced circumferential relation therearound; guides extended between the stepped sweeps and stepped knives around the facing peripheries of the inner and outer frames, to support the free ends of the sweeps and knives respectively; means to direct apples to be sliced onto the floor between the sweeps and knives; and means to rotate the inner frame to pass the sweeps thereon around between the knives.

In testimony whereof, I have hereunto set my hand at San Francisco, California, this 29th day of December, 1930.

NICHOLAS G. PAPAC.